United States Patent
Nakano

(10) Patent No.: US 10,625,475 B2
(45) Date of Patent: Apr. 21, 2020

(54) ULTRASONIC BONDING TOOL AND ULTRASONIC BONDING METHOD

(71) Applicant: Envision AESC Japan Ltd., Zama-shi, Kanagawa (JP)

(72) Inventor: Takahiro Nakano, Kanagawa (JP)

(73) Assignee: Envision AESC Japan Ltd., Zama (JP)

( * ) Notice: Subject to any disclaimer, the term of this patent is extended or adjusted under 35 U.S.C. 154(b) by 0 days.

(21) Appl. No.: 16/466,053

(22) PCT Filed: Dec. 27, 2016

(86) PCT No.: PCT/JP2016/088908
§ 371 (c)(1),
(2) Date: Jun. 3, 2019

(87) PCT Pub. No.: WO2018/122964
PCT Pub. Date: Jul. 5, 2018

(65) Prior Publication Data
US 2020/0070431 A1  Mar. 5, 2020

(51) Int. Cl.
*B32B 7/00* (2019.01)
*B29C 65/00* (2006.01)
(Continued)

(52) U.S. Cl.
CPC ...... *B29C 66/81433* (2013.01); *B29C 65/081* (2013.01); *B29C 66/21* (2013.01);
(Continued)

(58) Field of Classification Search
USPC .......................................... 156/73.1
See application file for complete search history.

(56) References Cited

U.S. PATENT DOCUMENTS 6,562,166 B2 * 5/2003 Molander ......... A61F 13/15585
156/73.1
7,793,815 B2 * 9/2010 Shimizu ................. B23K 20/10
156/73.1
(Continued)

FOREIGN PATENT DOCUMENTS

CN  1814388 A  8/2006
CN  102513686 A  6/2012
(Continued)

*Primary Examiner* — James D Sells
(74) *Attorney, Agent, or Firm* — Global IP Counselors, LLP

(57) ABSTRACT

An ultrasonic bonding tool is used on a horn side or anvil side of an ultrasonic joining device in which two synthetic resin sheets that include a polyethylene layer, a polypropylene layer and a ceramic heat-resistant layer are superposed and joined together so that the heat-resistant layers face each other. The ultrasonic bonding tool includes a plurality of protrusions shaped as quadrangular pyramids having a flat top surface. Each of the protrusions has an apex angle formed by two mutually opposite side surfaces that is within a range of 110-130°. When two separators of a battery cell are joined together using the ultrasonic bonding device with the ultrasonic bonding tool, a force with which the separators adhere to the protrusions is weak. In this way, the separators do not adhere to the horn during ultrasonic bonding of the synthetic resin sheets.

9 Claims, 4 Drawing Sheets

(51) Int. Cl.
*B29C 65/08* (2006.01)
*H01M 2/14* (2006.01)
*B29L 31/34* (2006.01)
*B29K 23/00* (2006.01)

(52) U.S. Cl.
CPC .......... *B29C 66/341* (2013.01); *B29C 66/433* (2013.01); *B29C 66/71* (2013.01); *B29C 66/72325* (2013.01); *B29C 66/73921* (2013.01); *H01M 2/145* (2013.01); *B29C 66/727* (2013.01); *B29C 66/73115* (2013.01); *B29K 2023/06* (2013.01); *B29K 2023/12* (2013.01); *B29L 2031/3468* (2013.01)

(56) References Cited

U.S. PATENT DOCUMENTS 9,272,466 B2 * 3/2016 Hull ...................... B65B 51/225

| | | | |
|---|---|---|---|
| 2013/0240153 | A1 | 9/2013 | Hull |
| 2015/0290873 | A1 | 10/2015 | Hull |
| 2019/0224776 | A1 * | 7/2019 | Hirose .................. B29C 65/081 |

FOREIGN PATENT DOCUMENTS

| | | |
|---|---|---|
| CN | 202571587 U | 12/2012 |
| CN | 104054206 A | 9/2014 |
| CN | 105382941 A | 3/2016 |
| CN | 205200793 U | 5/2016 |
| JP | 2001-502622 A | 2/2001 |
| JP | 2008-638 A | 1/2006 |
| JP | 2009-78452 A | 4/2009 |
| JP | 2013/105361 A1 | 7/2013 |
| JP | 2014-117752 A | 6/2014 |
| JP | 2015-185372 A | 10/2015 |
| JP | 2016-6718 A | 1/2016 |
| WO | 2013/105361 A1 | 7/2013 |
| WO | 2014/058001 A1 | 4/2014 |

* cited by examiner

ULTRASONIC BONDING TOOL AND ULTRASONIC BONDING METHOD

CROSS-REFERENCE TO RELATED APPLICATIONS

This application is a U.S. national stage application of International Application No. PCT/JP2016/088908, filed on Dec. 27, 2016.

BACKGROUND

Technological Field

This invention relates to an improvement in an ultrasonic bonding tool provided with protrusions used on a horn side or anvil side of an ultrasonic bonding device in which synthetic resin sheets are superposed and joined together.

Background Information

International Publication No. 2014/058001 (Patent Citation 1) indicates that a sheet-form separator is placed between positive and negative electrodes in a layered battery such as a lithium ion secondary battery. In the separator, a heat-resistant layer composed of ceramic particles is provided on one surface of a synthetic resin layer made of polypropylene or the like. A so-called bagged electrode is then obtained by sandwiching an electrode, e.g., a positive electrode, between two separators, and joining peripheral edges of the two separators together.

The two separators sandwiching the positive electrode are positioned so that the heat-resistant layers face each other, and are joined by heating at a plurality of locations on peripheral edges to form a bag-shaped separator. Using an interposed heat-resistant layer composed of ceramic particles makes it more difficult to fuse the synthetic resin layers by heat. Therefore, in Patent Citation 1, peripheral edges of the separator are provided with portions that have no heat-resistant layer and have a zero or reduced content of heat-resistant material such as ceramic, and the portions that have no heat-resistant layer are joined together by heating. An example of an ultrasonic bonding method is also disclosed in Japanese Laid-Open Patent Application No. 2009-78452 (Patent Citation 2).

Thus, methods in which separators that have a heat-resistant layer are joined together by heating require that portions devoid of a heat-resistant layer be formed.

Joining such sheet-form separators by ultrasonic bonding typically used to join current collectors of positive/negative electrodes and electrode tabs in the production of layered batteries is problematic, however, in that molten resin material readily adheres to knurled protrusions provided to a horn and/or an anvil.

SUMMARY

In an ultrasonic bonding tool according to this disclosure, a plurality of protrusions shaped as quadrangular pyramids having a flat top surface, and each of the protrusions has an angle greater than 90°, with the angle being an apex angle formed by two mutually opposite side surfaces from among four side surfaces.

Forming quadrangular pyramid shapes having apex angles greater than 90° in this manner suppresses adhesion between synthetic resin sheets constituting a workpiece and the side surfaces of the protrusions that bite into the synthetic resin sheets. Therefore, it is possible to suppress a phenomenon of the workpiece becoming affixed to the tool after ultrasonic bonding.

DETAILED DESCRIPTION OF THE EMBODIMENTS

A working example applied to an ultrasonic bonding tool for use in joining a bag-shaped separator of a layered battery cell is described below as a working example of this invention.

Figure 1:
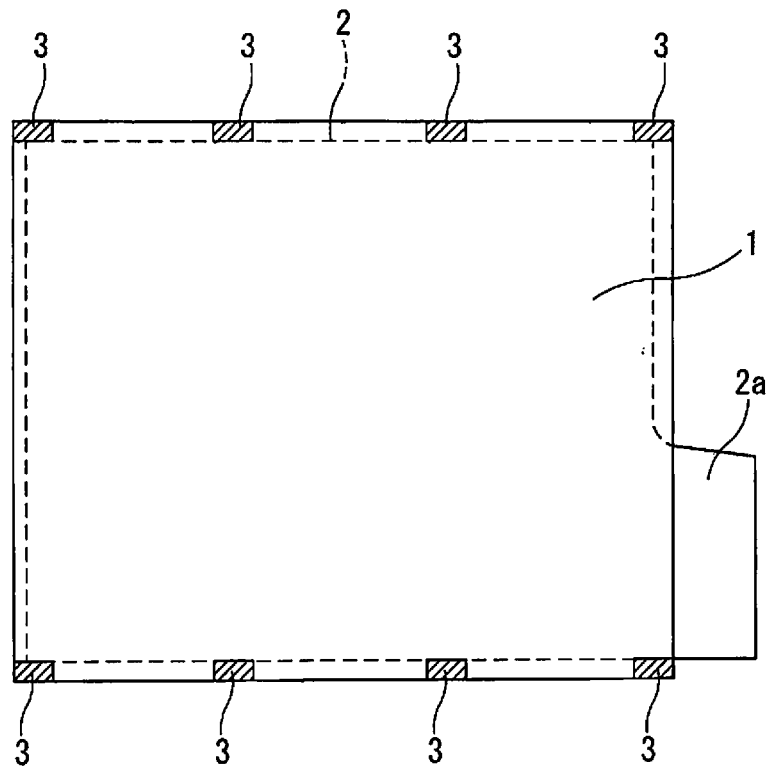
FIG. 1 is a plan view showing a bag-shaped separator of a bagged electrode as one example of a workpiece.

FIG. 1 shows a bagged electrode as a workpiece. The bagged electrode is configured as a so-called layered electrode assembly by joining together two sheet-form separators 1 at peripheral edges to form a bag-shaped body, sandwiching a positive electrode 2 in the bag-shaped body, and layering the bagged electrode in an alternating manner with a negative electrode (not shown), as disclosed in Patent Citation 1.

The sheet-form separators 1 are cut into a rectangular shape slightly larger than the positive electrode 2, and are joined together by ultrasonic bonding at joints 3 in a plurality of locations on peripheral edges, e.g., a total of eight locations such as are shown in FIG. 1. Part of a current collector of the positive electrode 2 extends from one side of the separators 1 as a tab 2a connected to an electrode tab (not shown).

Figure 3:
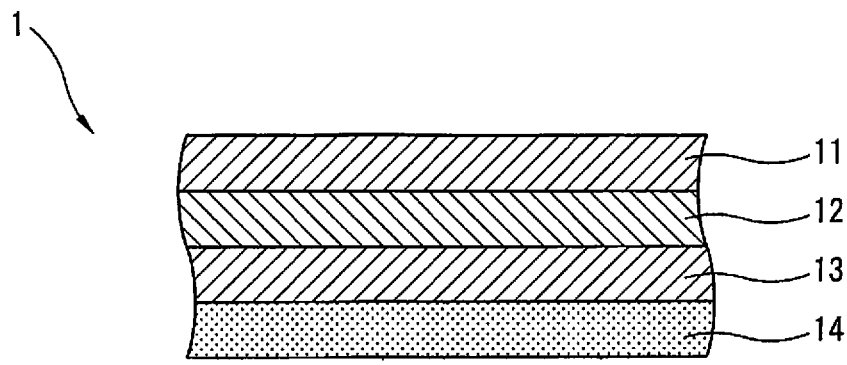
FIG. 3 is a cross-sectional view showing a layer structure of a separator.

As indicated by the cross-sectional structure in FIG. 3, each of the separators 1 has a four-layer structure that includes a polypropylene layer 11, a polyethylene layer 12, a polypropylene layer 13, and a heat-resistant layer 14 in the stated order from a surface on the outside of the bag-shaped body. Specifically, the separator 1 has three porous layers 11, 12, 13 as thermoplastic synthetic resin layers, and a heat-resistant layer 14 on one surface. The heat-resistant layer 14 can, for example, be configured as a porous ceramic layer in which ceramic particles are sprayed onto a synthetic resin layer together with a binder. The polypropylene layers 11, 13 can, for example, have a melting point of about 170° C., and the polyethylene layer 12 having a lower melting point (for example, having a melting point of about 140° C.) can be layered between the two polypropylene layers 11, 13.

Figure 2:
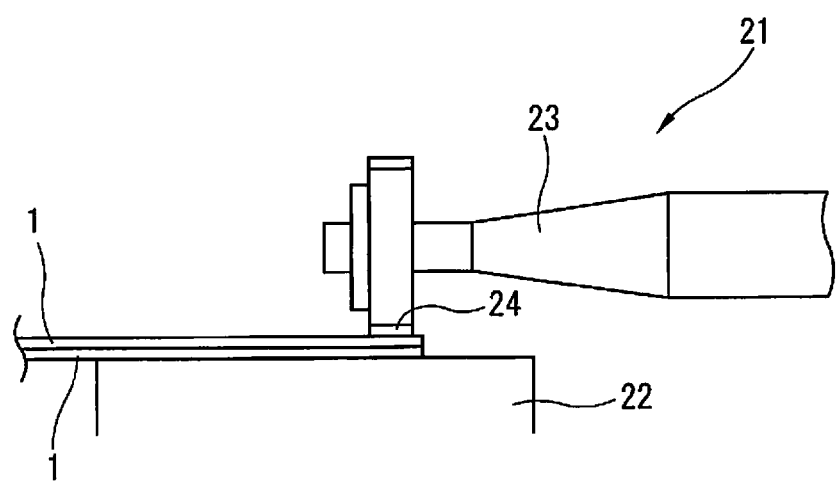
FIG. 2 is a diagram showing a general configuration of an ultrasonic bonding device.

When the separators 1 having such a four-layer structure are formed into a bag-shaped separator, the two sheet-form separators 1 are superposed together so that the heat-resistant layers 14 face each other, and the joints 3 at the peripheral edges are joined using an ultrasonic bonding device 21 as shown in FIG. 2.

The ultrasonic bonding device 21 is provided with an anvil 22 that supports a workpiece (the two separators 1) from below, and a horn 23 linked to an excitation device (not shown). An ultrasonic bonding tool, i.e., a tip 24 is provided to a distal end of the horn 23. The horn 23 is shaped as a round rod extending in a substantially horizontal direction, and is excited by the excitation device (not shown) along a longitudinal direction (left-right direction in FIG. 2) of the horn 23. The tip 24, which essentially constitutes a processing part in contact with the separators 1, is disposed at a position that is an anti-node of vibration of the horn 23. The horn 23 is pressed toward the anvil under a prescribed load by a pressing mechanism (not shown). Thus, the ultrasonic bonding device 21 fuses together the thermoplastic synthetic resin layers of the two separators 1 by imparting ultrasonic vibration while applying pressure to the two separators 1 between the horn 23 and the anvil 22.

Figure 4:
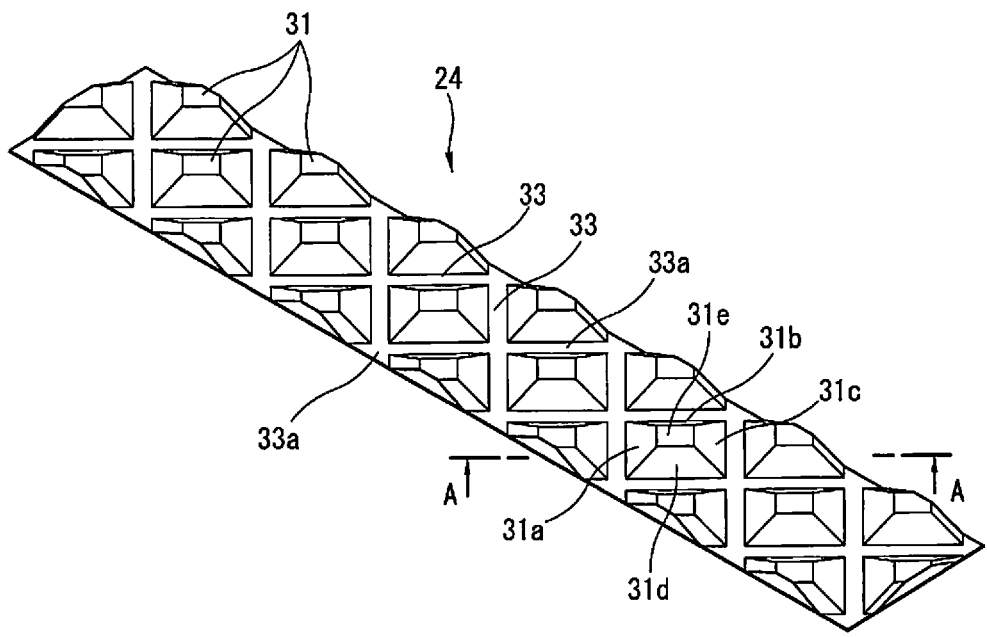
FIG. 4 is a perspective view showing a tip that is an ultrasonic bonding tool according to one working example.

The tip 24 is shaped as a rectangular plate that corresponds to the size of the joints 3, as shown in FIG. 4. The tip 24 can, for example, be formed as a component separate from the horn 23 using tool steel or the like, and can be used by being attached to the horn 23. Alternatively, the tip can be formed directly on the horn 23 as a part of the horn 23. In the example shown in FIG. 4, a vibration direction of the horn 23 is aligned with a width direction of the tip 24 (i.e., a direction orthogonal to a longitudinal direction of the tip 24).

Figure 6:
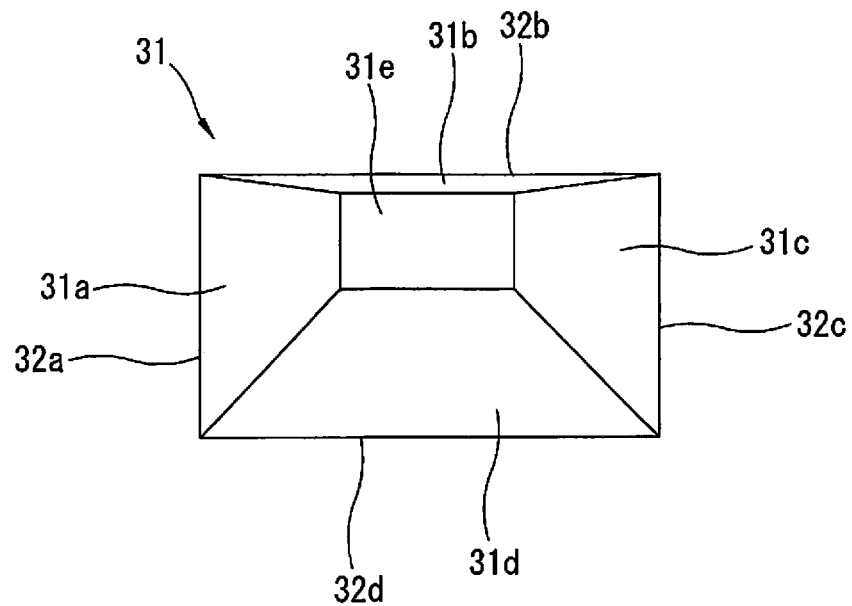
FIG. 6 is a perspective view showing one protrusion.

The tip 24 is provided with a plurality of protrusions 31 arranged in a regular pattern. Each of the protrusions 31 is shaped as a quadrangular pyramid having four inclined side surfaces 31a, 31b, 31c, 31d and a flat top surface 31e, as shown in FIG. 6. In particular, in this working example, each of the protrusions 31 is shaped as a square pyramid (strictly speaking, a square pyramid where a top part is cut off by the top surface 31e) in which four bottom sides 32a, 32b, 32c, 32d (see FIG. 6) form a square shape.

In addition, the plurality of protrusions 31 are arranged in a regular pattern at fixed intervals so that respective bottom sides are aligned in a straight line. More specifically, the plurality of protrusions 31 are arranged so that V-shaped grooves 33 formed between two adjacent protrusions 31 continue in a straight line. Taken as a whole, bottom surfaces 33a (i.e., surfaces present between the bottom sides of two protrusions 31) of the V-shaped grooves 33 are aligned in a single plane.

Furthermore, in the example shown in the drawings, the bottom sides 32a, 32b, 32c, 32d of the protrusions 31 are inclined at an angle of 45° relative to the longitudinal direction of the tip 24. Therefore, one diagonal direction of a quadrangle (a square in the example shown in the drawings) formed by the four bottom sides 32a, 32b, 32c, 32d is aligned with the vibration direction of the horn 23.

Figure 5:
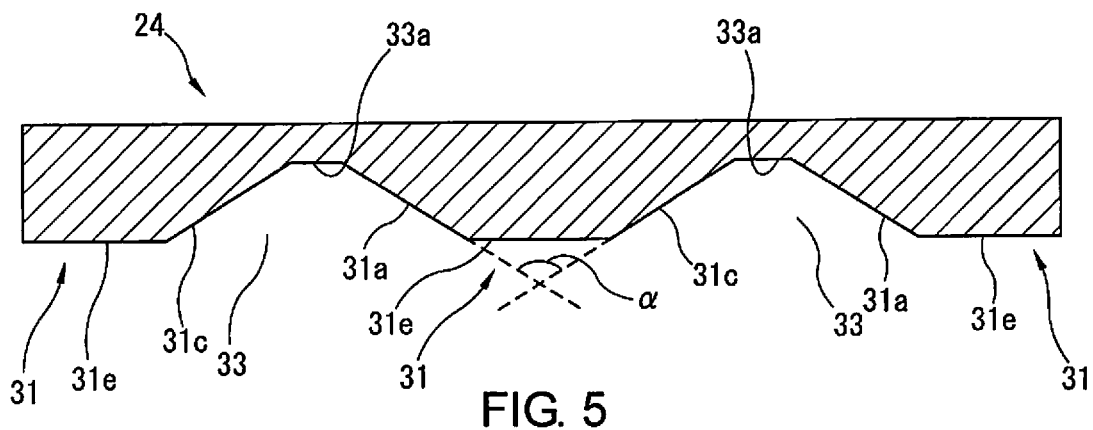
FIG. 5 is a cross-sectional view taken along line A-A in FIG. 4.

FIG. 5 shows a cross-section taken along line A-A in FIG. 4. More specifically, FIG. 5 shows a cross-section in which the tip 24 is cut along a plane that forms an angle of 45° relative to the longitudinal direction of the tip 24 and that passes through the top surfaces 31e of the protrusions 31. As shown in FIG. 5, an apex angle α formed by mutually opposite side surfaces (side surface 31a and side surface 31c in FIG. 5) that constitute two of the four side surfaces 31a, 31b, 31c, 31d forms an angle greater than 90°. The apex angle α is preferably within a range of 110-130°. In the example shown in the drawings, the apex angle α is 120°.

Because the protrusions 31 in the example shown in the drawings are square pyramids in which the four side surfaces 31a, 31b, 31c, 31d have identical shapes, the apex angle formed by the two remaining side surfaces 31b, 31d is equal to the apex angle α shown in FIG. 5.

In a preferred working example, the top surface 31e has a length of 0.2 mm on a side. Specifically, the top surfaces 31e of the protrusions 31 in this working example have a size of 0.2 mm×0.2 mm, and the apex angle α formed by the two mutually opposite side surfaces is 120°.

The protrusions 31 thus configured are formed by, for example, grinding or machining the V-shaped grooves 33 described above into a surface of a plate-shaped parent material composed of tool steel or the like.

Figure 7:
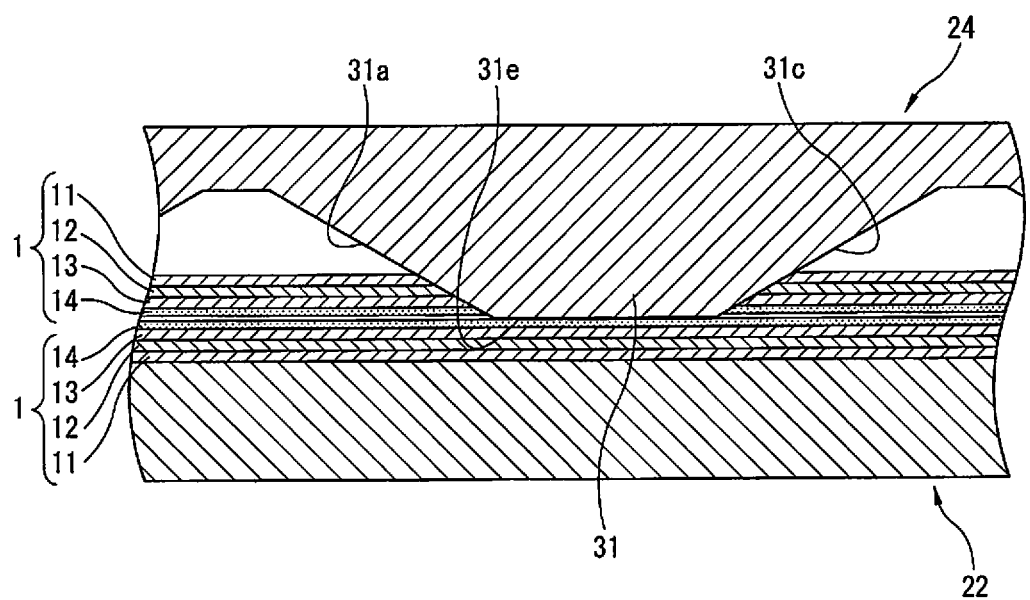
FIG. 7 is a cross-sectional view schematically showing a process of separators being joined by a protrusion.

FIG. 7 schematically shows a state that accompanies ultrasonic bonding of two sheet-form separators 1 that constitute a workpiece between the anvil 22 and the tip 24 provided with such protrusions 31. In the example shown in the drawing, the anvil 22 forms a flat surface. Imparting ultrasonic vibration while applying pressure at a prescribed load as described above causes the protrusions 31 of the tip 24 to bite into the two separators 1. This breaks the heat-resistant layers 14 composed of ceramic particles and reliably fuses together the thermoplastic synthetic resin layers (polypropylene layer 11, polyethylene layer 12, and polypropylene layer 13) of the respective separators 1.

As a result of the protrusions 31 biting into the thermoplastic synthetic resin layers, there is a concern that the molten thermoplastic synthetic resins (polyethylene or polypropylene) will adhere to the side surfaces 31a, 31b, 31c, 31d of the protrusions 31, and that the workpiece, remaining affixed to the horn 23 of the ultrasonic bonding device 21, will rise when the horn 23 is raised after completion of ultrasonic bonding. In particular, the molten resin of the polyethylene layer 12, which has a lower melting point than the polypropylene layer 11 on the outermost layer, appears on the surface of the polypropylene layer 11 and readily adheres to the side surfaces 31a, 31b, 31c, 31d. Moreover, during ultrasonic bonding, tensile force is typically imparted to the sheet-form separators 1 that constitute the workpiece. The release of the tensile force accompanying the end of ultrasonic bonding therefore results in the separators 1, which extended due to the tensile force, curling and readily being affixed to the side surfaces 31a, 31b, 31c, 31d of the protrusions 31.

In response to such a problem of adhesion of the workpiece, the tip 24 in this working example is configured such that the apex angle α of the protrusions 31 is greater than 90° (i.e., is obtuse). Adhesion of the workpiece to the protrusions 31 after ultrasonic bonding is therefore suppressed. One reason for this effect is that because the apex angle α is large, localized biting into the thermoplastic synthetic resin layers is suppressed, thus also suppressing a phenomenon of the molten resin of the polyethylene layer 12 that has the lower melting point being squeezed onto the surface of the polypropylene layer 11. Furthermore, when the tensile force on the sheet-form separators 1 is released as the ultrasonic bonding ends, the side surfaces 31a, 31b, 31c, 31d of the protrusions 31 are inclined by an angle less than 45° relative to the direction in which the separators 1 would curl, and therefore a force component acting in a direction perpendicular to the side surfaces 31a, 31b, 31c, 31d decreases and adhesion to the side surfaces 31a, 31b, 31c, 31d accompanying shrinkage of the sheet-form separators 1 becomes less likely to occur.

Therefore, when the joints 3 are ultrasonically bonded in sequence by the ultrasonic bonding device 21, the phenomenon of the workpiece becoming affixed to the horn 23 is suppressed and work efficiency is improved.

As described above, the apex angle α is preferably within the range of 110-130°. When the apex angle is less than 110°, the action for suppressing adhesion weakens. When the apex angle is greater than 130°, the biting of the protrusions 31 into the separators 1 weakens, and the action for breaking the heat-resistant layers composed of ceramic particles is likely to be insufficient.

In a more highly preferred second working example of the tip 24, a non-adhesive coating can be applied to the surfaces of the protrusions 31 having the shape described above. For example, shot blasting is performed on the surfaces of the protrusions formed by grinding, machining, etc.; the surfaces 31a-31e are polished together with rounding of edges that are boundaries between the surfaces 31a-31e; and a non-adhesive coating is applied. Suitable examples of the non-adhesive coating include tungsten-carbide-based coatings and chromium-nitride-based coatings. In this working example, a chromium-nitride-based coating that is produced by a physical vapor deposition method and is commercially provided under the name "BALINIT CROMA PLUS (registered trademark)" is applied at a film thickness of 4-10 μm.

Performing shot blasting and applying a non-adhesive coating in this manner further reduces the adhesion of the workpiece to the protrusions 31.

Figure 8:
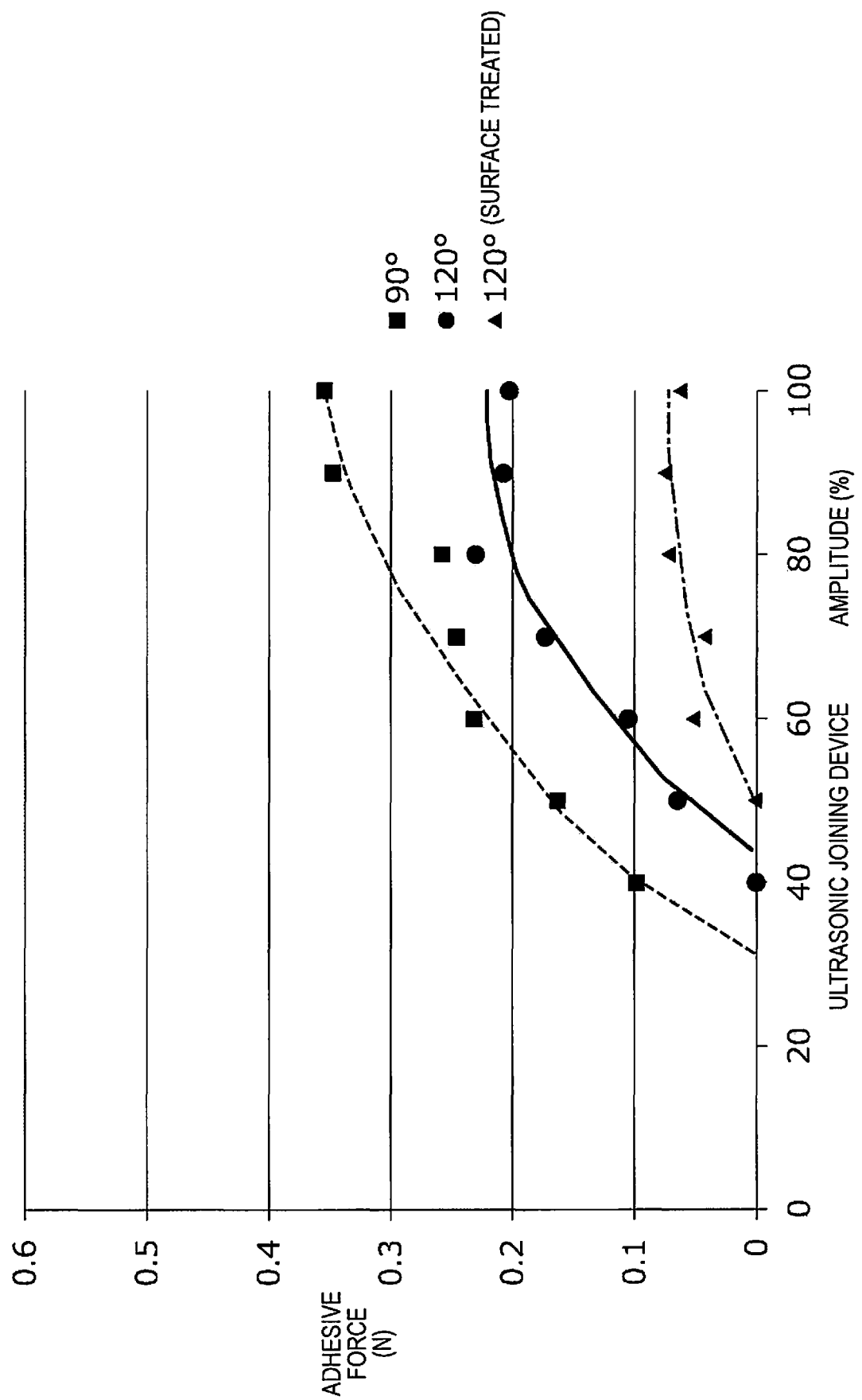
FIG. 8 is a characteristic graph showing characteristics pertaining to adhesive forces achieved by tips according to working examples and a tip according to a comparative example.

FIG. 8 is a graph in which characteristics pertaining to adhesion of the workpiece to the tip 24 accompanying ultrasonic bonding are compiled for a comparative example (without surface treatment) in which the apex angle α is 90°, a working example (without surface treatment) in which the apex angle α is 120°, and the second working example in which the apex angle α is 120° and the surface is shot-blasted and coated with a chromium-nitride-based coating. A horizontal axis shows amplitudes during a joining process performed by the ultrasonic bonding device 21, ultrasonic bonding being typically performed at a setting of about 50-70%. A vertical axis shows values evaluated as "adhesive force" that are obtained by measuring forces necessary to remove a workpiece (separator 1) from the tip 24, the workpiece having adhered to the tip 24 due to ultrasonic bonding. Top surfaces of protrusions of the comparative example are equal in size to the top surfaces 31e in the working examples, and said protrusions are shaped as square pyramids having an apex angle α of 90°.

As shown in FIG. 8, the adhesive force decreased in the working example in which the apex angle α was 120° to a greater extent than in the comparative example in which the apex angle α was 90°, and the adhesive force further decreased in the second working example in which surface treatment was carried out.

Working examples of this invention have been described above, but this invention is in no way limited to the above working examples; various modifications can be made. For example, the separators 1 are not limited to having a four-layer structure such as is described above; this invention is suitable for joining separators 1 that are provided with a heat-resistant layer on one surface of one or a plurality of thermoplastic synthetic resin layers, and also is suitable for joining separators 1 together in a shape other than that of a bagged electrode. Furthermore, this invention can be broadly applied even to joining of typical synthetic resin sheets that are not equipped with heat-resistant layers.

Also, in the working examples described above, examples were illustrated in which this invention was applied to a tool, i.e., a tip 24 provided to the horn 23 side of the ultrasonic bonding device 21, but it is also possible to provide an ultrasonic bonding tool having similar protrusions 31 to the anvil 22 side. Furthermore, the protrusions 31 can be provided to both the horn 23 side and the anvil 22 side.

A vibration direction of the ultrasonic bonding device 21 can be aligned with the longitudinal direction of the tip 24, which is shaped as a rectangle.

Also, in the working examples described above, the protrusions 31 were shaped as square pyramids, but the protrusions 31 can be shaped as other quadrangular pyramids in which a quadrangle configured by the four bottom sides is, for example, a rectangle or a rhombus. In this case, two apex angles formed by two mutually opposite side surfaces from among the four side surfaces must both be greater than 90°.

The invention claimed is:

1. An ultrasonic bonding tool used on one of a horn side and an anvil side of an ultrasonic joining device in which two synthetic resin sheets that each includes a polyethylene layer, a polypropylene layer and a ceramic heat-resistant layer are superposed and joined together so that the ceramic heat-resistant layers face each other, the ultrasonic bonding tool comprising:
    a plurality of protrusions shaped as quadrangular pyramids having a flat top surface; and
    each of the protrusions has an angle within a range of 110-130°, the angle being an apex angle formed by two mutually opposite side surfaces from among four side surfaces.

2. The ultrasonic bonding tool according to claim 1, wherein
    the apex angle is 120°.

3. The ultrasonic bonding tool according to claim 1, wherein
    the protrusions are shaped as square pyramids having the flat top surfaces.

4. The ultrasonic bonding tool according to claim 1, wherein
    the plurality of protrusions are arranged so that continuous straight lines of V-shaped grooves are formed between two adjacent ones of protrusions.

5. The ultrasonic bonding tool according to claim 1, wherein
    the ultrasonic bonding tool is used on the horn side; and
    the protrusions have one diagonal direction of a quadrangle formed by bottom sides is aligned with a vibration direction of the horn.

6. The ultrasonic bonding tool according to claim 1, wherein
    at least one surface of the protrusions is provided with a non-adhesive coating.

7. The ultrasonic bonding tool according to claim 1, wherein
    the polypropylene layer of the synthetic resin sheets is used as a workpiece that is positioned on an outside of the polyethylene layer in a joined state.

8. The ultrasonic bonding tool according to claim 7, wherein
    the workpiece is a bag-shaped separator of a battery cell.

9. An ultrasonic bonding method using the ultrasonic bonding tool according to claim 1 one of the horn side and the anvil side, the method comprising:
    imparting ultrasonic vibration while applying pressure to the two synthetic resin sheets that each includes thermoplastic synthetic resin layers having a polyethylene layer and a polypropylene layer, and that also each includes a ceramic heat-resistant layer, the thermoplastic synthetic resin layers and the ceramic heat-resistant layers of the two synthetic resin sheets being superposed so that the ceramic heat-resistant layers face each other; and breaking the ceramic heat-resistant layers and fusing the thermoplastic synthetic resin layers together.

* * * * *